United States Patent
Waters, Jr. et al.

(10) Patent No.: US 10,038,714 B2
(45) Date of Patent: Jul. 31, 2018

(54) DATA CENTER REDUNDANCY IN A NETWORK

(71) Applicant: Level 3 Communications, LLC, Broomfield, CO (US)

(72) Inventors: John F. Waters, Jr., Boulder, CO (US); Andrew Dugan, Superior, CO (US); Salvador Paredes, Broomfield, CO (US); Nasser Nabih El-Aawar, Denver, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 213 days.

(21) Appl. No.: 14/308,602

(22) Filed: Jun. 18, 2014

(65) Prior Publication Data
US 2014/0373140 A1    Dec. 18, 2014

Related U.S. Application Data

(60) Provisional application No. 61/836,344, filed on Jun. 18, 2013.

(51) Int. Cl.
H04L 29/06 (2006.01)
H04L 29/08 (2006.01)

(52) U.S. Cl.
CPC ...... H04L 63/1458 (2013.01); H04L 63/1408 (2013.01); H04L 63/1441 (2013.01); H04L 67/1002 (2013.01)

(58) Field of Classification Search
CPC . H04L 63/14; H04L 63/1408; H04L 63/1425; H04L 63/1441; H04L 63/1458
See application file for complete search history.

(56) References Cited

U.S. PATENT DOCUMENTS 6,880,090 B1 * 4/2005 Shawcross ............... H04L 12/18
                                                         709/225
8,613,089 B1 * 12/2013 Holloway ........... H04L 63/1458
                                                         709/217
(Continued)

FOREIGN PATENT DOCUMENTS

CA    2820308    7/2012

OTHER PUBLICATIONS

Hansen, Richard E., "Stateful Anycast for DDoS Mitigation", Jun. 2007, Massachusetts Institute of Technology, pp. 28-31.*

(Continued)

Primary Examiner — Hadi S Armouche
Assistant Examiner — Alexander R Lapian

(57) ABSTRACT

Aspects of the present disclosure involve systems, methods, computer program products, and the like, for data center redundancy in relation to a computer network. In particular, the present disclosure provides for one or more available redundant data centers, or bunkers, associated with a computer network. In one embodiment, the bunker data centers are configured to absorb traffic intended for an application operating on a data center when the traffic threatens to overwhelm the application. For example, during a distributed denial of service (DDOS) attack, the bunker data centers are configured to absorb some of the traffic from the DDOS attack to prevent the application that is the target of the attack from being overwhelmed.

17 Claims, 6 Drawing Sheets

(56) References Cited

U.S. PATENT DOCUMENTS

| | | | |
|---|---|---|---|
| 8,949,459 B1* | 2/2015 | Scholl | H04L 63/1458 709/239 |
| 2002/0103916 A1* | 8/2002 | Chen et al. | 709/229 |
| 2005/0125195 A1* | 6/2005 | Brendel | H04L 43/00 702/182 |
| 2006/0123479 A1 | 6/2006 | Kumar et al. | |
| 2006/0185014 A1* | 8/2006 | Spatscheck | H04L 63/1458 709/200 |
| 2006/0236394 A1 | 10/2006 | Morrow et al. | |
| 2006/0282891 A1* | 12/2006 | Pasko | 726/23 |
| 2009/0037592 A1 | 2/2009 | Lyon | |
| 2011/0213882 A1* | 9/2011 | Swildens et al. | 709/225 |
| 2012/0174196 A1* | 7/2012 | Bhogavilli | H04L 63/1458 726/5 |
| 2013/0055374 A1 | 2/2013 | Kustarz et al. | |
| 2014/0096194 A1* | 4/2014 | Bhogavilli et al. | 726/3 |

OTHER PUBLICATIONS

International Search Report, dated Oct. 28, 2014, Int'l Appl. No. PCT/US14/043034, Int'l Filing Date Jul. 18, 2014; 3 pg.s.
Written Opinion of the International Searching Authority, dated Oct. 28, 2014, Int'l Appl. No. PCT/US14/043034, Int'l Filing Date Jul. 18, 2014; 4 pgs.
International Preliminary Report on Patentability, dated Dec. 22, 2015, Int'l Appl. No. PCT/US14/043034, Int'l Filing Date Jun. 18, 2014; 6 pgs.
Extended European Search Report, dated Jan. 31, 2017, Application No. 14814001.5, filed Jun. 18, 2014; 6 pgs.

* cited by examiner

DATA CENTER REDUNDANCY IN A NETWORK

CROSS-REFERENCE TO RELATED APPLICATIONS

This application claims priority under 35 U.S.C. § 119(e) to U.S. Provisional Application No. 61/836,344 entitled "DATA CENTER REDUNDANCY IN A NETWORK", filed on Jun. 18, 2013 which is incorporated by reference in its entirety herein.

TECHNICAL FIELD

Aspects of the present invention generally relate to computer networks, and more particularly to responding to a loss of service at a data center of the network due to an attack and/or load balancing of data processed by the network through the data center.

BACKGROUND

Telecommunication networks provide for the transmission of information across some distance through terrestrial, wireless or satellite communication networks. Such communications may involve voice, data or multimedia information, among others. One particular aspect of such networks is data centers. Generally, data centers are facilities or portions of a network that utilize computer systems, such as telecommunications equipment and storage systems, to store data accessible to users of the network. For example, data comprising web pages are often stored in storage elements of data centers and accessible through one or more networks connected to the data center by the users of the network. In this manner, users to the network can access the data from the data centers to perform any number of functions.

However, data stored at data centers of a network may be vulnerable to certain types of attacks that affect the availability or integrity of the stored data. For example, a distributed denial of service (DDOS) attack may be used against certain data stored at the data center, such as data that is used to create web pages. A DDOS attack is a coordinated attack against one or more applications operating on a data center. The attack utilizes multiple compromised computing systems to flood the targeted application with traffic, i.e. data packets that the application cannot keep up with, which in many situations, crashes the application or makes the application otherwise unavailable to other users of the network. It is often difficult to counteract these attacks, as the data packets are sent from multiple IP addresses (preventing the simple blockage of packets from a single IP address). Further, it is often difficult to distinguish between legitimate packets from malicious packets. As a result of DDOS attacks or other types of security vulnerabilities of data centers, the data or application stored in the data center may not be available to legitimate users of the network, thereby reducing the reliability of the data center.

It is with these and other issues in mind that various aspects of the present disclosure were developed.

SUMMARY

One implementation of the present disclosure may take the form of a method for responding to a denial of service attack on a data center of a telecommunications network. The method includes the operations of hosting an application on a plurality of computing devices of a plurality of data centers, each of the plurality of data centers in communication with the telecommunications network and detecting a denial of service attack on the application hosted by at least one computing device of a first one of the plurality of data centers. The method also includes the operations of announcing an Internet Protocol (IP) address associated with the application from at least one computing device of a second one of the plurality of data centers in communication with the telecommunications network and routing one or more data packets associated with the denial of service attack to the at least one computing device of the second one of the plurality of data centers in communication with the telecommunications network.

Another implementation of the present disclosure may take the form of a telecommunications network. The network includes a plurality of data centers interconnected with a telecommunications network, each of the plurality of data centers comprising a plurality of computing devices, wherein at least one computing device of a first data center of the plurality of data centers hosts an application available to at least one user of the telecommunications network, a plurality of bunker data centers interconnected with the telecommunications network, each of the plurality of bunker data centers comprising a plurality of computing devices, and a network component. Further, the network components is configured to detect a denial of service attack on the application hosted by the at least one computing device of the first data center, initiate the application on at least one computing device of a first bunker data center of the plurality of bunker data centers, and obtain an Internet Protocol (IP) address associated with the application under the denial of service attack from one or more data packets intended for the application, the one or more data packets intended for the application comprising the IP address. In addition, the network component also announces the IP address associated with the application from the first bunker data center of the plurality of bunker data centers and routes one or more data packets associated with the denial of service attack to the application executed on the at least one computing device of the first bunker data center of the plurality of bunker data centers.

Yet another implementation of the present disclosure takes the form of a system for operating a telecommunications network. The system comprises a network component that includes a processor and a computer-readable medium. The computer-readable medium is associated with the processor and includes instructions stored thereon that are executable by the processor. When executed, the instructions perform the operations of detecting a denial of service attack on an application hosted by at least one computing device of a first data center of a plurality of data centers, each of the plurality of data centers in communication with the telecommunications network, initiating the application on at least one computing device of a first bunker data center of a plurality of bunker data centers interconnected with the telecommunications network, announcing the IP address associated with the application from the first bunker data center of the plurality of bunker data centers, and routing one or more data packets associated with the denial of service attack to the application executed on the at least one computing device of the first bunker data center of the plurality of bunker data centers.

DETAILED DESCRIPTION

Aspects of the present disclosure involve systems, methods, computer program products, and the like, for providing for data center redundancy in relation to a computer network. In particular, the present disclosure provides for one or more available redundant data centers, or bunkers, associated with a computer network. In one embodiment, the bunker data centers are configured to absorb traffic intended for an application operating on a data center when the traffic threatens to overwhelm the application. For example, during a distributed denial of service (DDOS) attack, the bunker data centers are configured to absorb some of the traffic from the DDOS attack to prevent the application that is the target of the attack from being overwhelmed. In addition, the bunker data centers may include a scrubbing application that analyzes the packets intended for an application and scrub away those packets that are identified by the network as being a part of the DDOS attack. Once scrubbed, the packets may be transmitted to the intended application through the network and processed accordingly. In this manner, the bunkers of the network operate to absorb and process some packets intended for an executing application of a data center of the network to prevent a DDOS or other type of malicious attack from overwhelming the application such that the application can continue to operate properly.

In another embodiment, the bunker data centers of the network are configured to process data packets intended for an application to load balance the data being processed by the network. In this embodiment, an application may be distributed among one or more bunker data centers such that each data center and/or bunkers of the network that have a copy of the application execute the application. Thus, the network may obtain the data packets intended for an application and route those packets to one of the one or more data centers and bunkers. Because the application is distributed among the data centers of the network, the data packets may be processed by the application at one of the data centers or bunkers. In this manner, the network can balance the incoming data packets between the distributed applications operating on the separate data centers and bunkers such that one instance of the application is not overrun with the incoming data packets. In another embodiment, the application may be executed on a single data center, but the incoming packets may be filtered through the one or more bunkers to prevent unnecessary packets from being processed by the application to reduce the overloading of the application.

Figure 1:
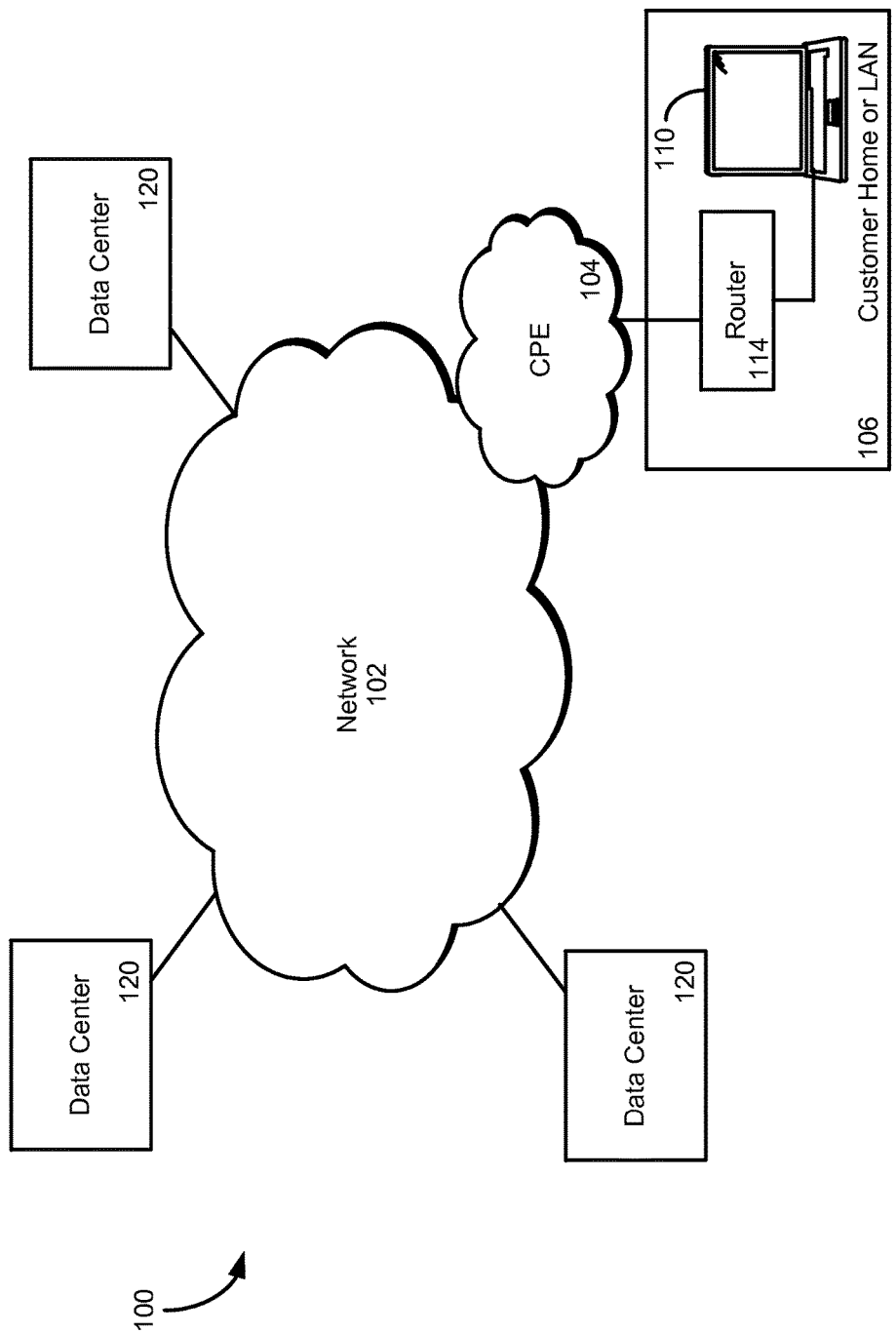
FIG. 1 is a schematic diagram illustrating an exemplary network operating environment in accordance with one embodiment.

FIG. 1 illustrates an exemplary operating environment 100 for implementing one or more data center bunkers in a network for protection and load balancing of applications operating on data centers associated with the network. With specific reference to FIG. 1, the environment 100 includes a network 102 provided by a wholesale network service provider. The network may be a virtual private network (VPN) or any type of data network to which one or more computers are connected. In one example, the network 102 may include the Internet. The network 102 includes numerous components such as, but not limited to, servers and routers which enable the exchange of data across the network 102, but are not shown or described in detail here because those skilled in the art will readily understand these components. In one embodiment, the network 102 is maintained and provided by one or more network service providers to provide access to data and/or applications stored on the network to one or more users of the network. Also relevant to this description is the interaction and communication between the network 102 and other entities, such as the one or more customer home or business local area networks (LANs) 106 and/or computers 110.

Customer network 106 can include communication devices such as, but not limited to, a personal computer 110, cellular phone, personal digital assistance (PDA) laptop, and the like connected to a router/firewall 114. The communication and networking components of the customer network 106 enable a user of the customer network 106 to communicate to the network 102 to obtain and store data, as well as interact with one or more applications stored and executed on the network. Components of the customer network 106 are typically home- or business-based, but they can be relocated and may be designed for easy portability. For example, the communication device 110 may be IP-based wireless device (e.g., cellular, PDA, etc.).

The customer network 106 typically connects to the network 102 via one or more customer-provided equipment or customer-premises equipment (CPE) 104 that forms a border network. In one example, the border network 104 is an Internet Service Provider (ISP). The border network and CPEs 104 are typically provided and maintained by a business or organization such as a local telephone company or cable company. The border network 104 may provide network/communication-related services to their customers through the CPEs of the border network. Similar border networks 104 may provide a connection interface between the network 102 and one or more data centers 120 associated with the network. Thus, although not illustrated in FIG. 1 for simplicity, a CPE 104 network may connect the data centers 120 to the network 102 in a similar manner as described above.

In general, the data centers 120 associated with the network 102 are collections of computer systems, such as telecommunication systems and storage systems, for hosting and executing one or more applications available to the users of the network. For example, a data center 120 may host data representing a webpage that is accessible through the internet. Thus, the data center 120 may include one or more storage servers for storing the webpage and one or more routers and/or servers for connecting the data to a requesting user of the network 102. Other components of the data center 120 may include databases, file servers, application servers, middleware and the like. In addition, many data centers 120 utilize an Internet Protocol (IP) transmission protocol standard for routing and transmitting of the packets and messages for connecting a user to the applications and data stored in the data center. Further description of the various components of the data center 120 is described below with reference to FIG. 2.

As shown in FIG. 1, a plurality of data centers 120 may be associated with the network 102. The data centers 120 may execute or otherwise be associated with an application available to users of the network 102. The assignment of an application to a particular data center 120 may be based on any number of criteria, such as location of the data center, size of the application, availability constraints of the application to particular users of the network, and the like. However, in general, each data center 120 associated with the network 102 is accessible by a user via the network.

Figure 2:
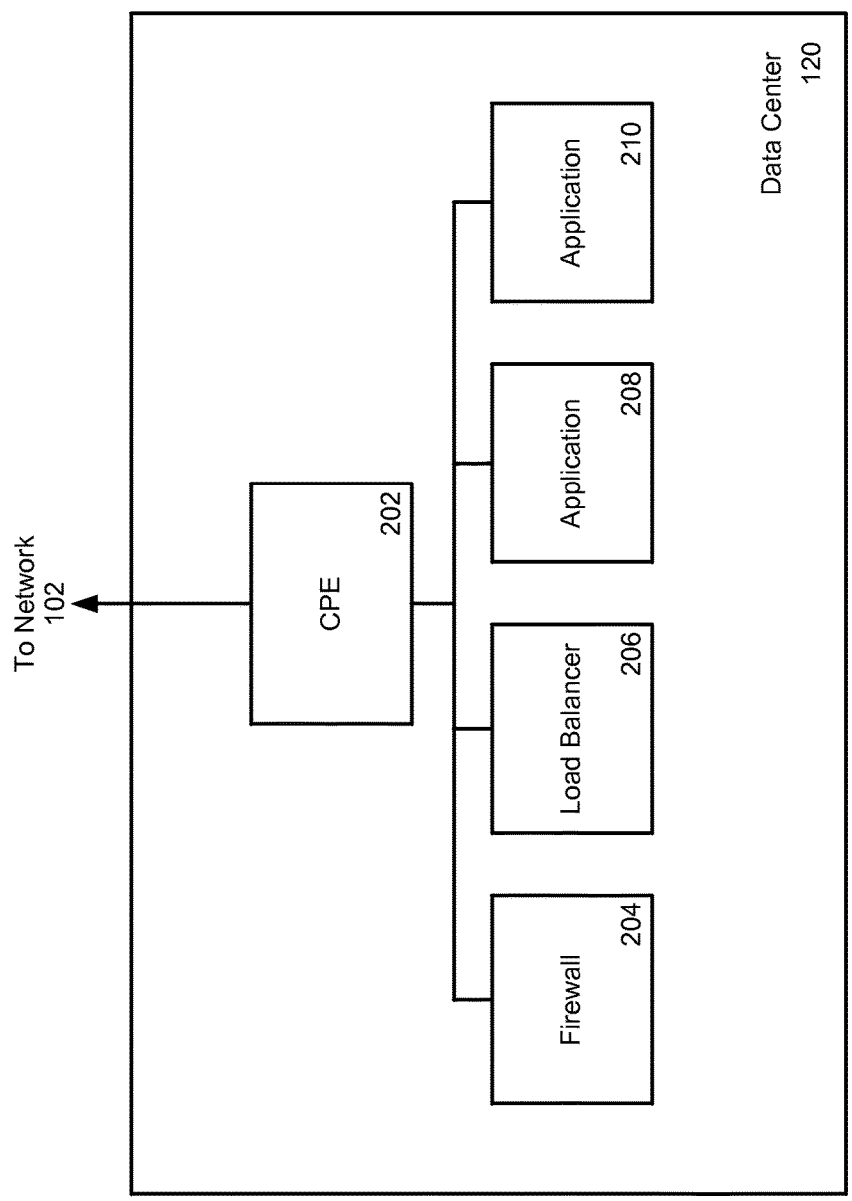
FIG. 2 is a block diagram illustrating a data center associated with a network.

As discussed above, the data centers may include several components to aid in storing and executing an application. FIG. 2 is a block diagram illustrating an example data center associated with a network. The components illustrated in the data center 120 of FIG. 2 are just a few of the components that may be included in a data center. Several additional components are described above with reference to FIG. 1, as well as other components known to those of skill in the art that may be included in a data center associated with a network.

As shown, the data center 120 includes one or more customer-premises equipment (CPE) 202 that connect the data center to the network 102. In general, the CPE 202 is configured to receive the data packets from the network intended for the data center 120 and route those packets to the intended component. A firewall 204 may also be incorporated into the data center 120 to filter incoming and outgoing packets and information to protect the components and applications of the data center. Similarly, a load balancing component 206 may be integrated with the data center 120 to balance the load of transmitted packets within and through the data center.

In addition, one or more applications 208, 210 may be stored and executed within the data center 120. For example, the data center 120 may include one or more application servers that host the applications 208, 210. In general, the applications 208, 210 receive one or more data packets from the network 102 and process the data packets within the application environment. The applications 208, 210 then typically transmit back one or more data packets to a requesting user of the network 102. In one example, the application 208 is a webpage. Thus, the application 208 receives a request to access the webpage from a user via the network 102 and, in response, transmits the data that comprises the webpage back to the user through the network. This communications may occur utilizing one or more IP-based communication protocols. As such, the application, or application server, may be associated with one or more IP addresses that identify the application server to the network for receiving and transmitting the data packets. Thus, the user device 110 connected to the network 102 transmits a request for data or information stored at the IP address for the application server. The application server returns the stored data back to the user's device 110 through the network 102. It is through this operation that the applications 208, 210 are made available to the users of the network 102.

Figure 3:
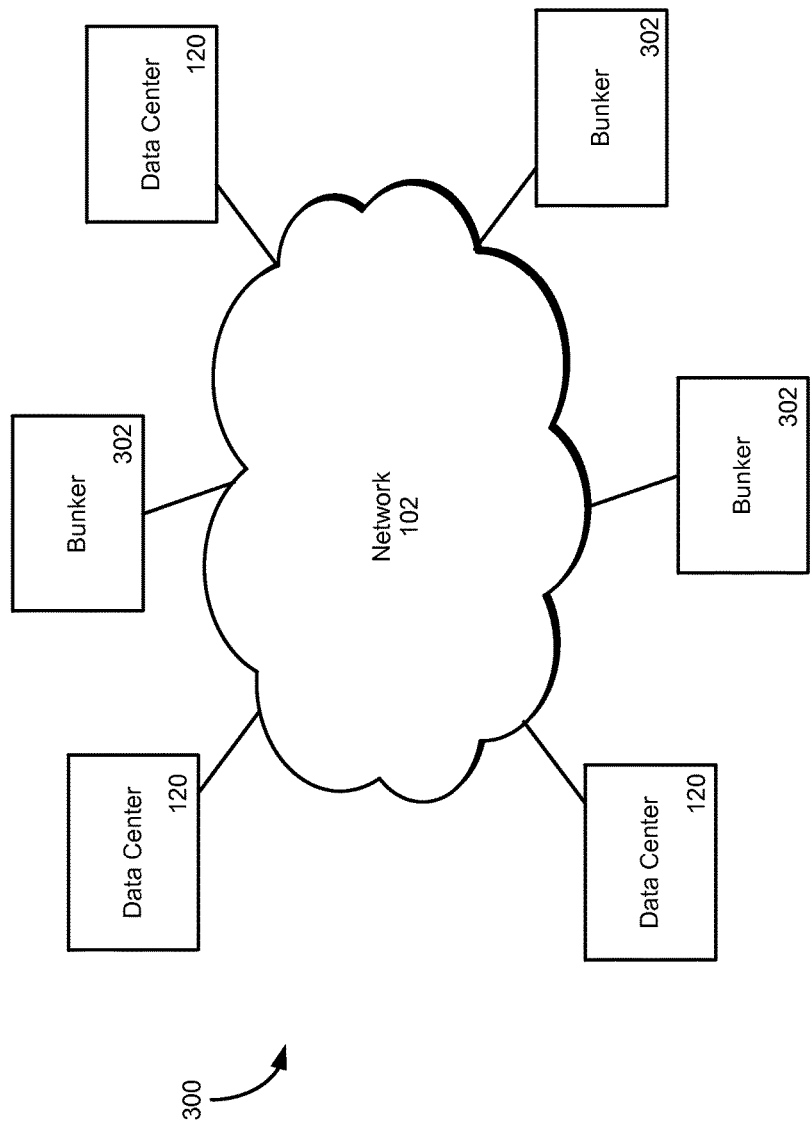
FIG. 3 is a schematic diagram illustrating a network operating environment utilizing backup or redundant data centers.

In addition to the data centers, the network 102 may also include one or more bunker data center sites associated with the network. FIG. 3 is a schematic diagram illustrating a network operating environment utilizing backup or redundant data centers. As shown in FIG. 3, the network 102 includes one or more bunker 302 sites. The bunkers 302 or bunker sites operate as back-up or redundant data centers that can be utilized during operation of the network 102 in response to one or more malicious attacks on applications of the data center 120. In particular and as described in more detail below, the bunkers 302 may operate during a DDOS attack on an application at one of the data centers 120. In addition, the bunkers 302 may aid in load balancing the data packets intended for the one or more data centers 120 such that the applications of the data centers are not overwhelmed.

The bunkers 302 of the network 102 are similar in structure and components to the data centers 120 described above. Thus, the bunkers 302 may include routers, application servers, storage servers and the like. In general, the bunkers 302 are configured to operate as another data center 120 of the network 102. In addition, the bunkers 302 may include additional components, such as a scrubbing component. As described in more detail below, the scrubbers of the bunkers 302 operate to distinguish between malicious data packets and proper packets intended for an application, and scrub away the malicious packets or otherwise modify the packets to reduce the negative effects of the malicious packets. Other components also described below that may be a portion of the bunkers 302 include a load balancer component, a content dampening component and a server farm for hosting one or more distributed applications.

In one embodiment, the bunkers 302 of the network 102 do not operate as a data center 120 of the network all of the time. Rather, in this embodiment, the operation of the bunkers 302 begins in response to a DDOS attack on an application at one of the operating data centers 120. As explained above, a DDOS attack is a coordinated attack against one or more applications operating on a data center 120 by flooding a targeted application with traffic that the application cannot keep up with, which in many situations, crashes the application. Further, because the data packets are sent from multiple IP addresses thereby preventing the simple blockage of packets from a single IP address, it is often difficult to counteract such attacks.

Figure 4:
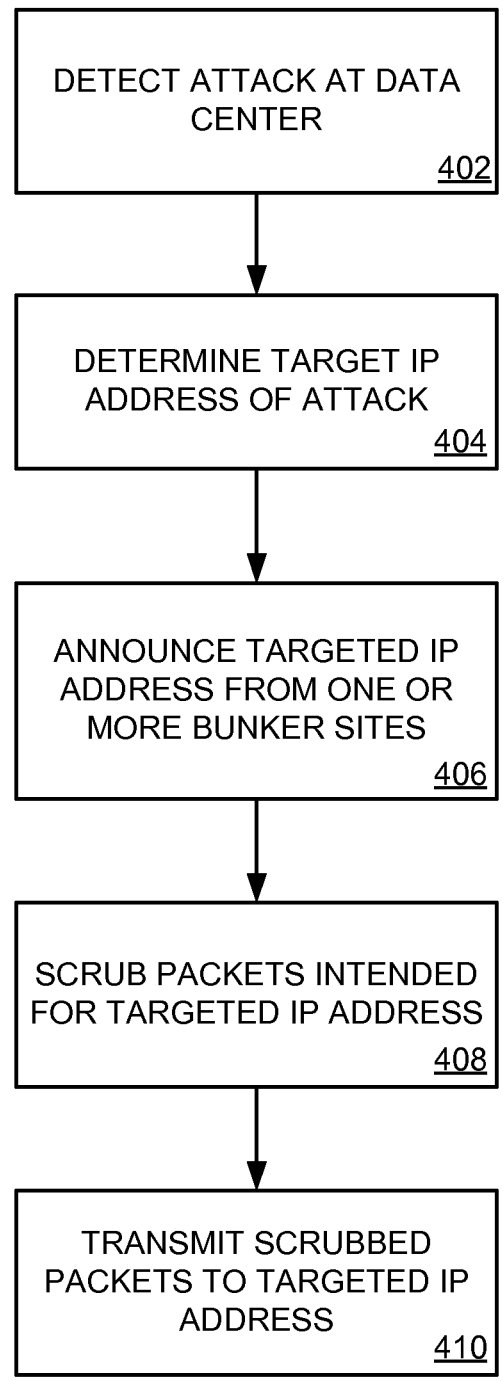
FIG. 4 is a flowchart of a method for a network to utilize one or more redundant data centers to respond to a denial of service attack.

One approach to counteracting DDOS attacks in a network is to use one or more bunkers 302 in a network 102. In particular, FIG. 4 is a flowchart of a method for a network 102 to utilize one or more bunkers 302 to respond to a denial of service or other type of data center attack. The operations of the method of FIG. 4 may be performed by one or more components of the network 102, the bunkers 302 and/or the data centers 120. For example, an application server operating on the network 102 may be configured to perform the operations described below in response to a recognized DDOS attack on one or more applications executing on the data centers 120.

Beginning in operation 402, the network 102 detects a DDOS or other type of denial of service attack. For example, the network 102 may detect an unusual amount of traffic (inbound transmission packets) intended for a particular app or applications executing on one or more data centers 120 of the network. An unusually high number of data packets intended for a particular application may indicate that the application is under attack. When an attack is detected, the network 102 determines in operation 404 the IP address of the targeted application or application server. In general, an application executing on a data center is identifiable by the IP address associated with that application. In general, packets intended for an application utilize the IP address to identify the destination of the packets. As such, when a DDOS attack is detected, the network 102 determines the IP address of the targeted application by analyzing the intended destination of the incoming packets.

In operation 406, the network 102 announces the targeted IP address from one or more bunker sites 302. In one embodiment, the network 102 utilizes an Anycast-type announcing scheme to announce the IP address under attack from the bunkers 302. By announcing the targeted IP address from the one or more bunkers 302, traffic or data packets intended for the data center or application under attack are now routed to the one or more bunkers 302. In particular, due to transmission rules within the network, data packets associated with the targeted IP address are transmitted to the nearest bunker 302 or data center 120 that has announced the targeted IP address to the origination of the data packet. Thus, in one embodiment, the bunkers 302 are disparately located in the network 102, either geographically or logically, to provide a wide net to attract the illegitimate traffic intended for the targeted application. In one particular embodiment, the bunkers 302 are located at major intersections of the network 102 to prevent long distance transmission of illegitimate data packets through the network. In this manner, the DDOS traffic intended for a targeted application is diverted to the one or more bunkers 302 that have announced the targeted IP address.

As should be appreciated, legitimate data packets intended for the targeted application may also be diverted to the bunkers 302 after the IP address has been announced by the bunkers. Thus, in operation 408, the bunkers 302 utilize the one or more scrubbers associated with the bunkers to clean the data packets for the targeted application. As explained above, a scrubber identifies those data packets that are potentially malicious intended for the targeted application and removes or otherwise prevents those packets from being transmitted to the application. Similarly, the scrubber identifies potentially legitimate packets intended for the target application and allows those packets to continue to be routed to the application, executing in either the data centers 120 or the bunkers 302. Thus, in operation 410, the packets that are identified as legitimate packets are transmitted to the targeted application through the network 102.

In one embodiment, the network 102 transmits the scrubbed transmission packets to the identified application's IP address through a tunnel or back channel on the network. This prevents the scrubbed packets from being diverted to another bunker 302 during transmission to the data center 120. As such, a dedicated transmission path may be used by each bunker 302 to provide the clean and legitimate data packets to the application through the network 102 after the packets have been scrubbed or otherwise identified as legitimate. The malicious packets may not be transmitted to the data center 120 or otherwise discarded such that only legitimate packets are transmitted to the application at the data center. In general, however, the scrubbed data packets may be transmitted through the network to the data center 120 in any fashion.

In this embodiment, upon detection that the DDOS or other attach has ceased, the network 102 may cease the announcement of the targeted IP address from the bunkers 302 and return the announcement of the target IP address from the data center 120 hosting the application under attack. Thus, as can be appreciated from the operations of FIG. 4, the network 102, upon a detection of a DDOS attack, can utilize the bunkers 302 to distribute the incoming traffic intended for the targeted application among one or more bunkers such that the application may continue to operate. In other words, by distributing the malicious packets to bunkers in the network, the application may remain free to receive legitimate packets such that the application remains available to users of the network 102.

In another embodiment of the network 102, the targeted application is distributed among the one or more bunkers 302 such that traffic intended for the targeted application is diverted to the bunkers and executed by the copy of the application located at that bunker. In this embodiment, the application at each bunker 302 executes the received traffic (either scrubbed by the scrubbers of the network or not scrubbed). This embodiment may also protect against a DDOS attack as the malicious data packets are spread out over the distributed applications at the bunker sites 302 such that no one application of the network is overrun by the DDOS attack. In addition, the protection scheme outlined above applies to any IP-based telecommunication network routing, including content distribution network (CDN) and Voice Over IP (VoIP) networks.

Figure 5:
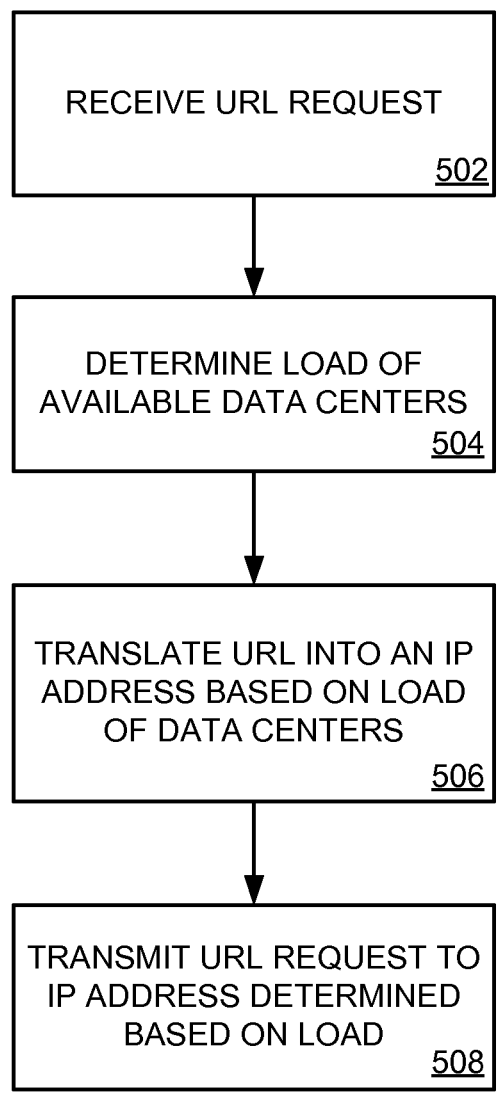
FIG. 5 is a flowchart of a method for a network to utilize one or more redundant data centers to load balance requests for data from the network.

In addition to aiding during a DDOS attack on an application, the bunkers 302 of the network 102 may also help load balance the traffic to one or more distributed applications. As mentioned above, some instances of an application can be distributed among one or more data centers 120 and/or bunkers 302. FIG. 5 is a flowchart of a method for a network to utilize one or more bunkers or data centers to load balance requests for data from the network. Similar to the operations of FIG. 4, the operations of the method of FIG. 5 may be performed by one or more components of the network 102, the bunkers 302 and/or the data centers 120.

Beginning in operation 502, the network 102 receives a uniform resource locator (URL) identifier or other location address for a distributed webpage or application hosted by the network 102. In operation 504, the network 102 determines one or more load characteristics of the data centers 120 or bunkers 302 that host a distributed version of the webpage or application associated with the received URL or other locator. For example, the network 102 may consider the load at each data center 120 or bunker 302, the origin of the URL request in relation to the available data centers and bunkers, the data centers and bunkers that have a copy of the distributed application, and the like. With this information, the network 102 may determine a relative load value for each data center 120 and bunker 302 that host a copy of the distributed application. This information is then utilized by the network 102 to select a data center 120 or bunker 302 of the network 102 to receive the request for access of the distributed application. As should be appreciated, any network information may be obtained and used to load balance requests for an application across the multiple instances of a distributed application.

Further, each data center 120 or bunker 302 that hosts a copy of the distributed application may be associated with a different IP address that identifies the application. For example, a first data center may include a first IP address associated with the first data center's copy of the distributed application, while a second data center may include a second IP address associated with the second data center's copy of the distributed application. The different IP addresses recognized by the network 102 for the different versions of the distributed application may be utilized to select a particular version of the application for receiving the URL request. In particular, in operation 506, the network translates the URL request into an IP address that is associated with the selected data center 120 or bunker 302 based on the load information gathered above. In this manner, the network 102 selects a particular data center 120 or bunker 302 that includes the distributed application to receive and process the URL request. Thus, in operation 508, the URL request is transmitted to the provided or selected IP address to balance the load for a distributed application across multiple data centers or bunkers. Further, similar to the method of FIG. 4, the method of FIG. 5 applies to any IP-based telecommunication network routing, including content distribution network (CDN) and Voice Over IP (VoIP) networks.

Additional features may also be included in the one or more bunkers 302 to aid in the execution and protection of the applications hosted by the network 102. For example, the bunkers 302 may include one or more filters that filter traffic intended for an application. Similar to the scrubbers described above, the filters identify malicious or otherwise illegitimate traffic intended for a targeted application and blocks the transmission of the malicious packets. The filters may be associated with one or more routers within the bunker 302 and may be customizable by an administrator of the bunker site. For example, the filters may be configured to deny transmission of data packets from a known malicious party or origin location. In addition, the bunkers 302 may include one or more content dampening components. In some instances, a particular application or portion of the application is more distributable than other applications or aspects of the application. For example, a front page of a website is likely more distributable than a page that requires an input from a user. In the instance where a webpage requires input from a user, it may be important that the same copy of the distributed application receive the data packets from the user. However, a front page, or page that does not require any input from the user other than the initial request for the page, may be stored on any version of the distributed application and provided to a user upon the request. Thus, by providing the highly distributable portion of the application to one or more bunkers 302 or data centers 102 and storing that data in the content dampeners, the data is more easily accessible upon a request, thereby potentially reducing the processing needs of the network in response to a request.

This dampening may also occur in response to a high traffic occurrence. For example, during a DDOS attack, the network 102 may distribute the highly distributable aspects of the application to other bunkers 302 and/or data centers 120 to relieve the traffic requests for that page. However, the network 102 may retain the other less distributable aspects of the application to one or a few data centers 120 as those portions are less likely to be a subject of a DDOS attack.

Finally, one or more bunkers 302 of the network 102 may include traffic gathering and analysis components to determine the data packets being transmitted into and out of the respective bunker. This information may be gathered and stored and provided to the network 102 during the load analysis portion of the method of FIG. 5. In general, the bunkers may include any additional components or functionalities that aid in protecting against a DDOS attack to an application hosted by the network.

Figure 6:
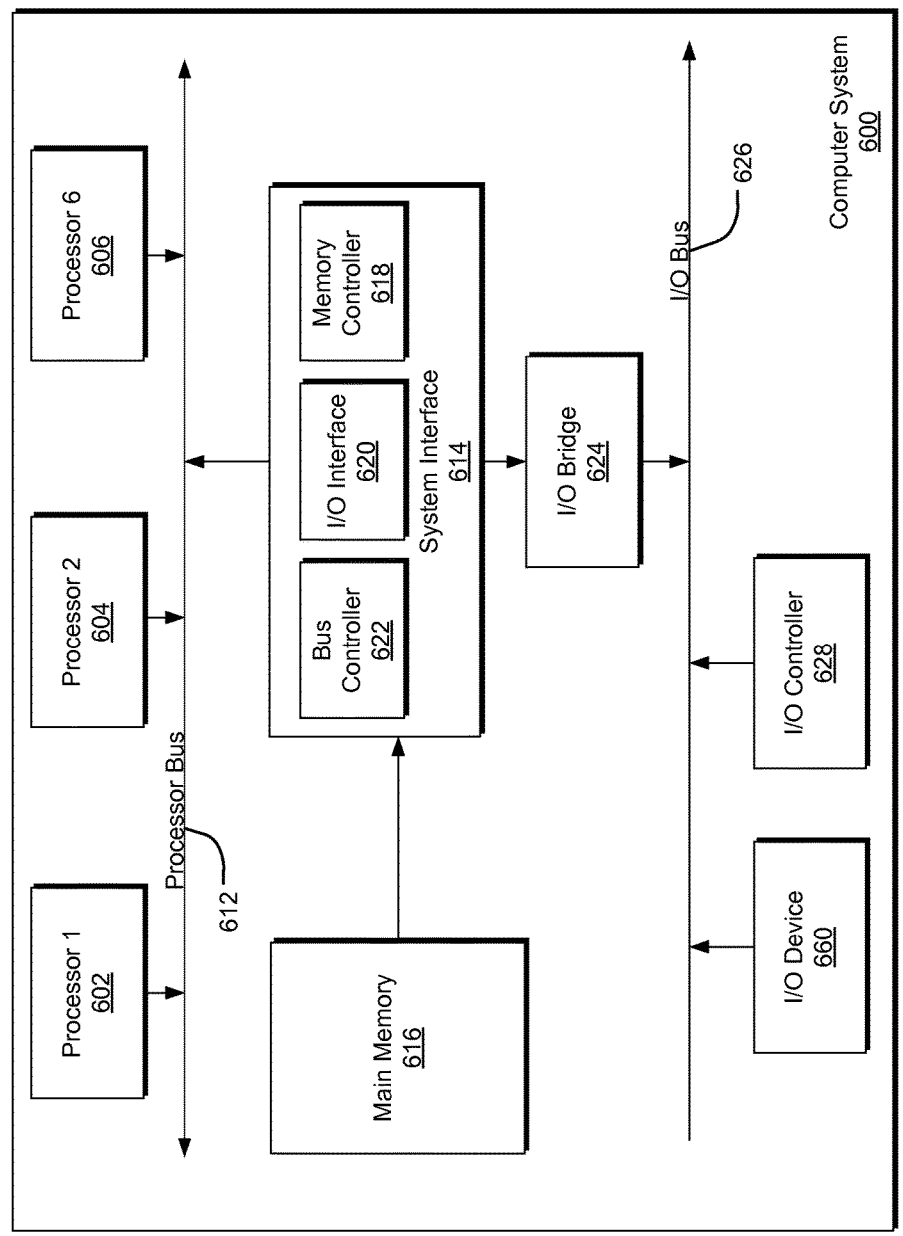
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the bunkers disclosed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for responding to a denial of service attack on a data center of a telecommunications network, the method comprising:
hosting an application on a plurality of computing devices of a plurality of data centers, each of the plurality of data centers in communication with the telecommunications network;
detecting a denial of service attack on the application hosted by at least one computing device of a first one of the plurality of data centers;
announcing, by a router, an Internet Protocol (IP) address associated with the application from at least one computing device of a second one of the plurality of data centers in communication with the telecommunications network;
routing one or more data packets associated with the denial of service attack to the at least one computing device of the second one of the plurality of data centers in communication with the telecommunications network; and
ceasing, by a router, the announcement of the Internet Protocol (IP) address associated with the application from the at least one computing device of the second one of the plurality of data centers in communication with the telecommunications network upon determining the completion of the denial of service attack on the application;
wherein announcing and ceasing the announcement of the IP address associated with the application from the at least one computing device of the second one of the plurality of data centers in communication with the telecommunications network is an Anycast-type routing protocol.

2. The method of claim 1 further comprising:
obtaining the IP address associated with the application under the denial of service attack from one or more data packets intended for the application, the one or more data packets intended for the application comprising the IP address.

3. The method of claim 1 further comprising:
identifying one or more packets of the denial of service attack as illegitimate data packets; and
discarding the one or more illegitimate denial of service attack data packets from the telecommunications network.

4. The method of claim 1 further comprising:
identifying one or more data packets of the denial of service attack as legitimate data packets; and
transmitting the one or more legitimate data packets to the application hosted by at least one computing device of a first one of the plurality of data centers.

5. The method of claim 4 wherein the transmitting the one or more legitimate data packets to the application hosted by at least one computing device of a first one of the plurality of data centers comprises creating a dedicated transmission tunnel through the telecommunications network for transmission of the one or more legitimate data packets to the application.

6. A telecommunications network comprising:
a plurality of data centers interconnected with a telecommunications network, each of the plurality of data centers comprising a plurality of computing devices, wherein at least one computing device of a first data center of the plurality of data centers hosts an application available to at least one user of the telecommunications network;
a plurality of bunker data centers interconnected with the telecommunications network, each of the plurality of bunker data centers comprising a plurality of computing devices; and
a non-transitory computer-readable medium associated with a processor and including instructions stored thereon and executable by the processor to:
detect a denial of service attack on the application hosted by the at least one computing device of the first data center;
initiate the application on at least one computing device of a first bunker data center of the plurality of bunker data centers;
obtain an Internet Protocol (IP) address associated with the application under the denial of service attack from one or more data packets intended for the application, the one or more data packets intended for the application comprising the IP address;
announce, by a router, the IP address associated with the application from the first bunker data center of the plurality of bunker data centers;
route one or more data packets associated with the denial of service attack to the application executed on the at least one computing device of the first bunker data center of the plurality of bunker data centers; and
cease, by a router, the announcement of the IP address associated with the application from the first bunker data center of the plurality of bunker data centers upon determining the completion of the denial of service attack on the application;
wherein announcing and ceasing the announcement of the IP address associated with the application from the first bunker data center of the plurality of bunker data centers in communication with the telecommunications network is an Anycast-type routing protocol.

7. The telecommunications network of claim 6 wherein the stored instructions are further executable by the processor to:
identify one or more packets of the denial of service attack as illegitimate data packets; and
discard the one or more illegitimate denial of service attack data packets from the telecommunications network.

8. The telecommunications network of claim 6 wherein at least one computing device of a second data center of the plurality of data centers hosts the application available to at least one user of the telecommunications network, the stored instructions are further executable by the processor to:
receive a uniform resource locator (URL) request for the application;
obtain an indication of a processing load of the application of the at least one computing device of the first data center and the application of the at least one computing device of a second data center; and
announce the IP address for the application from the at least one computing device of the second data center based at least on the processing load of the application of the at least one computing device of the first data center and the application of the at least one computing device of a second data center.

9. The telecommunications network of claim 8 wherein the processing load of the application of the at least one computing device of the second data center is less than the processing load of the application of the at least one computing device of the first data center.

10. The telecommunications network of claim 9 wherein the stored instructions are further executable by the processor to transmit the URL request to the application of the at least one computing device of the second data center.

11. The telecommunications network of claim 6 wherein the stored instructions are further executable by the processor to:
   identify one or more data packets of the denial of service attack as legitimate data packets; and
   transmit the one or more legitimate data packets to the application hosted by the at least one computing device of the first data center.

12. The telecommunications network of claim 11 wherein the transmitting the one or more legitimate data packets to the application hosted by the at least one computing device of the first data center comprises creating a dedicated transmission tunnel through the telecommunications network for transmission of the one or more legitimate data packets to the application.

13. A system for operating a telecommunications network, the system comprising:
   a processor; and
   a non-transitory computer-readable medium associated with the processor and including instructions stored thereon and executable by the processor to:
      detect a denial of service attack on an application hosted by at least one computing device of a first data center of a plurality of data centers, each of the plurality of data centers in communication with the telecommunications network;
      initiate the application on at least one computing device of a first bunker data center of a plurality of bunker data centers interconnected with the telecommunications network;
      announce, by a router, an Internet Protocol (IP) address associated with the application from the first bunker data center of the plurality of bunker data centers;
      route one or more data packets associated with the denial of service attack to the application executed on the at least one computing device of the first bunker data center of the plurality of bunker data centers; and
      cease, by a router, the announcement of the IP address associated with the application from the first bunker data center of the plurality of bunker data centers upon determining the completion of the denial of service attack on the application;
      wherein announcing and ceasing the announcement of the IP address associated with the application from the first bunker data center of the plurality of bunker data centers comprises an Anycast-type routing protocol.

14. The system of claim 13 wherein the stored instructions are further executable by the processor to:
   identify one or more packets of the denial of service attack as illegitimate data packets; and
   discard the one or more illegitimate denial of service attack data packets from the telecommunications network.

15. The system of claim 14 wherein the stored instructions are further executable by the processor to:
   identify one or more data packets of the denial of service attack as legitimate data packets; and
   transmit the one or more legitimate data packets to the application hosted by the at least one computing device of the first data center.

16. The system of claim 15 wherein the transmitting the one or more legitimate data packets to application hosted by at least one computing device of a first data center of a plurality of data centers comprises creating a dedicated transmission tunnel through the telecommunications network for transmission of the one or more legitimate data packets to the application.

17. The system of claim 13 wherein the stored instructions are further executable by the processor to:
   obtain the IP address associated with the application under the denial of service attack from one or more data packets intended for the application, the one or more data packets intended for the application comprising the IP address.

* * * * *